US006353276B1

United States Patent
Gendron

(10) Patent No.: US 6,353,276 B1
(45) Date of Patent: Mar. 5, 2002

(54) HIGH EFFICIENCY ALTERNATING AND DIRECT CURRENT ELECTROSTATIC MOTOR

(76) Inventor: Daniel Gendron, 1040, rue Des Pins, R.R.2, Saint-Nicéphore, Quebec (CA), J2A 2A1

( * ) Notice: Subject to any disclaimer, the term of this patent is extended or adjusted under 35 U.S.C. 154(b) by 0 days.

(21) Appl. No.: 09/635,835

(22) Filed: Aug. 11, 2000

(30) Foreign Application Priority Data

Sep. 15, 1999 (CA) ............................................ 2284188

(51) Int. Cl.[7] .................................................. H02N 1/00
(52) U.S. Cl. ...................................................... 310/309
(58) Field of Search ................................ 310/309, 308, 310/40 MM, 269

(56) References Cited

U.S. PATENT DOCUMENTS

| 3,629,624 A | * | 12/1971 | Staudte .......................... 310/309 |
| 4,225,801 A | * | 9/1980 | Parker, Jr. .................... 310/308 |
| 4,943,750 A | * | 7/1990 | Howe et al. .................. 310/309 |
| 5,001,381 A | * | 3/1991 | Watanabe ...................... 310/309 |
| 5,187,399 A | * | 2/1993 | Carr et al. ................ 310/40 MM |
| 5,189,323 A | * | 2/1993 | Carr et al. ............. 310/40 MM |
| 5,262,695 A | * | 11/1993 | Kuwano et al. ............. 310/309 |
| 5,296,775 A | * | 3/1994 | Cronin et al. ................ 310/309 |
| 5,541,465 A | * | 7/1996 | Higuchi et al. .............. 310/309 |
| 5,808,383 A | * | 9/1998 | Kostov et al. ................ 310/12 |

FOREIGN PATENT DOCUMENTS

| JP | 6 292 376 | * | 10/1994 | |
| JP | 6 296 376 | * | 10/1994 | |
| JP | 6 311 763 | * | 11/1994 | |
| JP | 7-194147 | * | 7/1995 | .................. 310/309 |
| JP | 8-9662 | * | 1/1996 | .................. 310/309 |
| JP | 8-66058 | * | 3/1996 | .................. 310/309 |
| JP | 8 088 984 | * | 4/1996 | |
| JP | 9-37569 | * | 2/1997 | ........... 310/40 MM |

* cited by examiner

*Primary Examiner*—Karl Tamai

(57) ABSTRACT

The present invention provides an electrostatic motor wherein the poles of the stator have a substantial geometry in the shape of fixed "comb-poles" adapted to be crossed by moving "comb-poles" of the rotor. The fixed comb-poles are equally spaced apart, radially and inwardly extending from an electrically insulating hollowed outer cylinder forming the stator, while the moving comb-poles are equally spaced apart, radially and outwardly extending from an electrically insulating inner cylinder forming the rotor and located inside the stator. Having all those combs essentially facing each other allows for taking full advantage (100% in theory) of the electric force vector created between adjacent comb-poles of the stator onto the free moving rotor comb-poles when they are electrically charged. The rotor comb-poles become charged by passing through a stator comb-pole thereby eliminating any known collector devices. This geometry allows for making AC or DC motors using the electrostatic power with a theoretical efficiency of nearly 100%.

20 Claims, 11 Drawing Sheets

HIGH EFFICIENCY ALTERNATING AND DIRECT CURRENT ELECTROSTATIC MOTOR

FIELD OF THE INVENTION

The present invention relates to electrostatic motors, and more specifically a motor geometry that allows for taking full advantage of the electric force vector created between adjacent stator poles for high efficiency.

BACKGROUND OF THE INVENTION

A principle related to the conversion of the electrical power into mechanical power via a motor is a known concept. So far, the existing principles have not demonstrated a useful efficiency (not even in theory) because the geometry of the different parts simply does not allow for fully taking advantage of all the electric force created by the "poles". Moreover, the existing principles show serious disadvantages whenever using collector devices, on the other hand they require an external control to produce a required specific sequence scheme of source supply voltages. The existing electrostatic motors barely work and practically develop no torque, hardly what it needs to overcome the ball bearings and/or air friction.

Until now, the only missing factor is an adequate motor (stator and rotor) geometry that allows for taking a full advantage of the force vector of the electric field since it is the only way to get a theoretical efficiency of 100%. It is also required to solve the problem of collector devices, to eliminate the controls, and to decrease as much as possible the source supply voltages while keeping an optimum efficiency.

OBJECTS OF THE INVENTION

It is therefore general object of the present invention to provide an electrostatic motor that obviates the above noted disadvantages.

Another object of the present invention is to provide an electrostatic motor that easily reaches an efficiency of 75%, in the same order of magnitude that of any standard motor that uses the driving magnetic power.

A further object of the present invention is to provide an electrostatic motor that eliminates the use of collector devices.

Another object of the present invention is to provide an electrostatic motor with a geometry that can be used for either linear or rotary motors using the electrical (electrostatic) power.

A further object of the present invention is to provide an electrostatic motor with a geometry that can be used for either direct of multi-phase alternating voltage supply.

Yet another object of the present invention is to provide an electrostatic motor with a geometry that applies to any motor power and size.

Still another object of the present invention is to provide an electrostatic motor that is very light in weight for a specific output torque and/or power, compared to standard motors.

There is also the rotor cylinder, because of the optimum geometry, that has an unoccupied internal portion which can be used. A motor in the shape of a ring which inside section consists of blades forming a "turbine" for ventilation or propulsion can easily be built. In this way, no support or motor blocks the fluid intake or the fluid outlet.

According to the present invention, the use of the electrostatic motor along with the three-phase voltage supply principles would be an asset to the industry for many reasons. First, they require a lower voltage ratio of the transmission voltages over those needed, as opposed to conventional motors, since they operate at high voltage. Buying high voltage electricity is less expensive and overall losses are reduced. Smaller or even no transformers are required. The electrostatic motors of the present invention could easily be directly connected to a three-phase 25 kV voltage line.

Another important advantage for the industry is that the present motor partially operates as a capacitive load, as opposed to the conventional motor that partially operates as an inductive load. So, rather than balancing the power factor by actually connecting capacitors to the main power source distribution of a factory, for example, this could simply be done by connecting one of the present capacitive motor instead, taking further advantage of a useful load at the same time; thereby counterbalancing the inductive effect of the conventional motors.

Other objects and advantages of the present invention will become apparent from a careful reading of the detailed description provided herein, with appropriate reference to the accompanying drawings.

SUMMARY OF THE INVENTION

According to the present invention, there is provided an electrostatic motor device comprising:

a stator member including a plurality of pole members circumferentially equally spaced apart around an inner surface of an electrically insulating hollowed outer cylinder, each pole member includes a plurality of inwardly radially protruding and equally spaced apart electrically conductive elongated teeth along an axial direction of said hollowed cylinder, all teeth of a same pole member being electrically connected to each other at their respective radial outermost extremity by an axial stator conductor member, every one of said stator conductor members being alternately electrically connected together to corresponding ones of said stator conductor members to form at least two electrically isolated alternating groups, each of said groups being adapted for electrically connecting to a different polarity of a voltage source, said teeth of said stator pole members being fully covered with an insulating coat material except for their respective base region in proximity of said inner surface of said outer cylinder;

a rotor member including a plurality of pole members circumferentially equally spaced a part around an outer surface of an electrically insulating inner cylinder rotatably supported to and coaxial to said outer cylinder, each pole member includes a plurality of outwardly radially protruding and equally spaced apart electrically conductive elongated teeth along said axial direction, said teeth of said stator pole members being adapted to have corresponding teeth of said rotor pole members freely moving therebetween; and a shaft member secured to said rotor member and coaxial to both said cylinders; said shaft member rotating along with said rotor member upon application of said voltage source to said stator pole members.

Preferably, each of said teeth of both said stator and rotor pole members are substantially cylindrical in shape.

Preferably, the distance between two adjacent of said teeth of said stator pole members is substantially sized slightly larger than one of said teeth of said rotor pole members thereby ensuring no physical contact between corresponding stator and rotor teeth during rotation of said rotor member.

Preferably, the voltage source is a constant voltage source, said stator member has an even number of pole members with every second of said stator conductor members alternately electrically connected together to form two alternating groups, each of said groups being adapted for electrically connecting to a different polarity of said constant voltage source, thereby creating constant electric fields between two adjacent stator pole members, said teeth of said rotor pole members being simultaneously charged via electric sparks when getting in close proximity to a respective one of said stator pole members and being displaced towards an adjacent of said stator pole members under said constant electric field.

Preferably, the rotor member has an odd number of pole members.

Preferably, the teeth of said rotor pole members are also fully covered with said insulating coat material except for their respective tip region moving closely to said base region of said teeth of stator pole members, thereby forcing said electric sparks to occur between respective uncovered regions.

Preferably, the outer cylinder includes two electrically conductive ring members each interconnecting one of said groups of said stator conductor members to a respective polarity of said constant voltage source, and the ring members are each located at a respective axial extremity of said outer cylinder.

Alternatively, the voltage source is an alternating three-phase voltage source, said stator member having a plurality of trio of pole members, every third of said stator pole members being alternately electrically connected together to form three alternating groups, each of said groups being adapted for electrically connecting to a different phase of said three-phase voltage source, thereby creating an electric field rotating around said axial direction between said stator pole members, said rotor member having at least one corresponding pair of pole members for each said trio of stator pole members, said teeth of said rotor pole members being simultaneously charged via electric sparks when getting in close proximity to a respective one of said stator pole members and being displaced towards an adjacent of said stator pole members under said rotating electric field, said electric sparks occurring at a frequency that gradually decreases until said rotor member reaches the rotating speed of said rotating electric field, thereby said electric motor device being an asynchronous type motor.

Preferably, the rotor member has only one corresponding pair of pole members for each said trio of stator pole members.

Alternatively, the voltage source is an alternating three-phase voltage source, said stator member having a plurality of trio of pole members, every third of said stator pole members being alternatively electrically connected together to form three alternating groups, each of said groups being adapted for electrically connecting to a different phase of said three-phase voltage source, thereby creating an electric field rotating around said axial direction between said stator pole members, said rotor member having at least one corresponding pair of pole members for each said trio of stator pole members, all teeth of a same rotor pole member being electrically connected to the others at their respective radial innermost extremity by an axial rotor conductor member, every second of said rotor conductor members being alternately electrically connected together to form two electrically isolated alternating sets, said sets being adapted for eletrically connecting to a positive and a negative polarities of a constant voltage source respectively thus getting electrically charged, said charged rotor pole members being displaced towards a respective adjacent of said stator pole members under said rotating electric field after said rotor member has been given same rotating speed as of said rotating electric field, thereby said electric motor device being a synchronous type of motor.

Preferably, the rotor member has only one corresponding pair of pole members for each said trio of stator pole members.

Preferably, the outer cylinder includes three electrically conductive stator ring members each interconnecting one of said groups of said stator conductor members to a respective phase of said three-phase voltage source, said inner cylinder includes two electrically conductive rotor ring members each interconnecting one of said sets of said rotor conductor members to a respective polarity of said constant voltage source.

Preferably, two of said stator ring members are each located at a respective axial extremity of said outer cylinder, the third stator ring member is equally spaced apart from and inbetween the other two stator ring members, said rotor ring members are each located at a respective axial extremity of said inner cylinder.

Preferably, all teeth of said pole members of both said stator and rotor members being fully covered with an insulating coat material to ensure no electric spark occur between teeth of adjacent stator and rotor pole members.

BRIEF DESCRIPTION OF THE DRAWINGS

In the annexed drawings, like reference characters indicate like elements throughout.

DETAILED DESCRIPTION OF THE PREFERRED EMBODIMENTS

Figure 1:
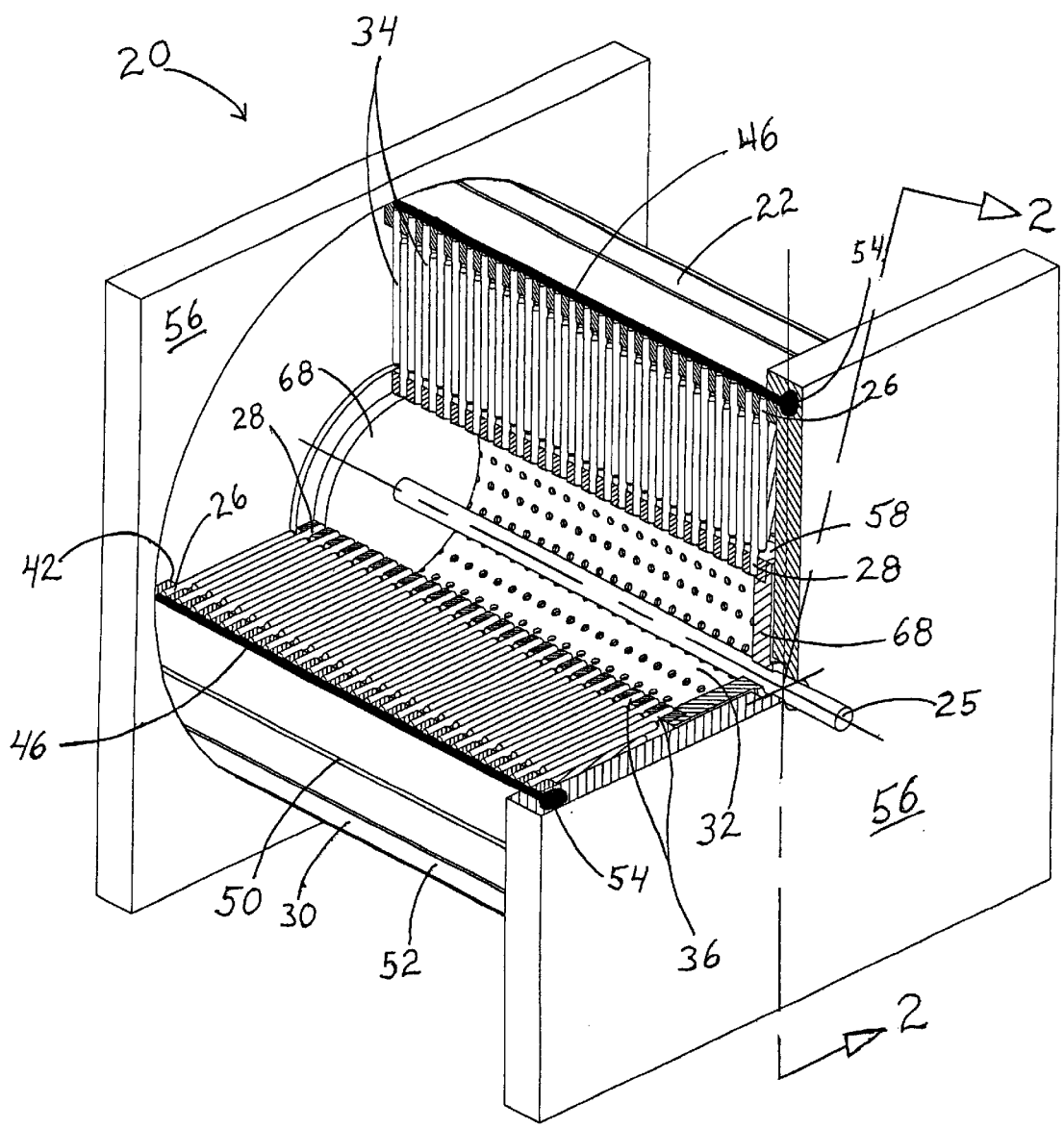
FIG. 1 is a partially sectioned perspective view of an embodiment of a DC (Direct Current) electrostatic motor according to the present invention.
Figure 2:
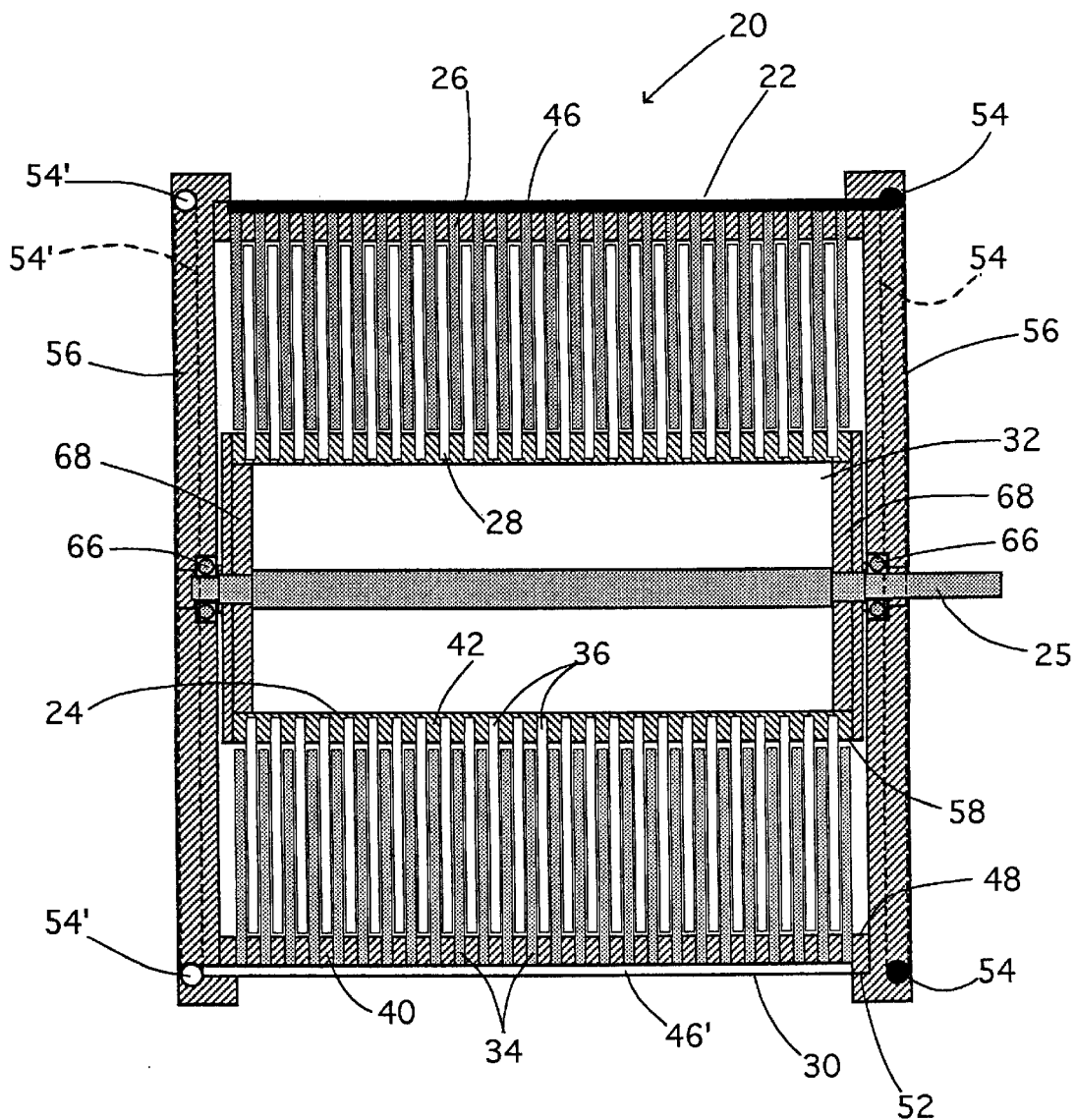
FIG. 2 is a section view taken along line 2—2 of FIG. 1.
Figure 3:
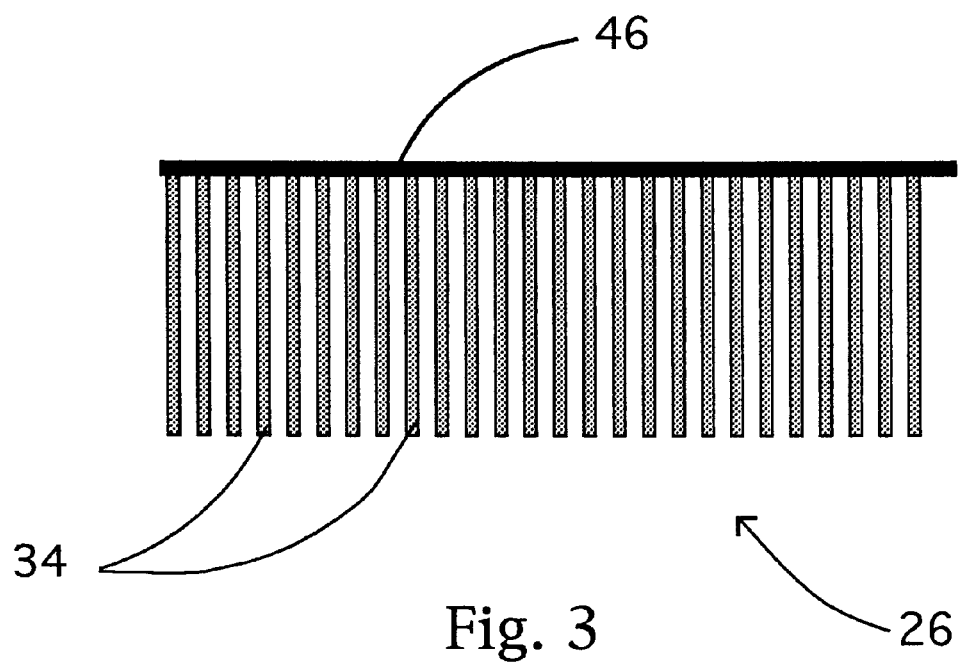
FIG. 3 is a front view of a comb-pole of the stator of embodiment of FIG. 1.
Figure 4:
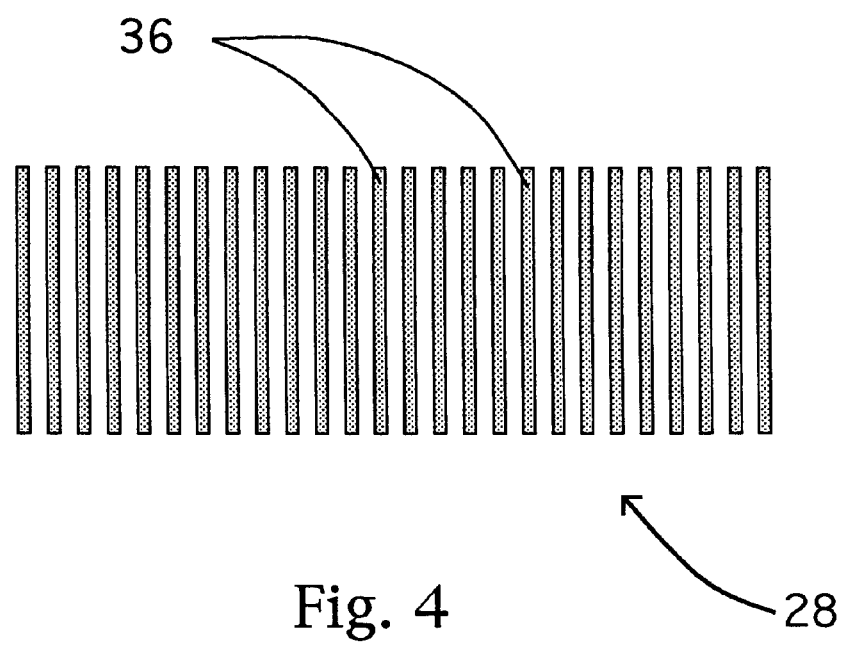
FIG. 4 is a front view of a comb-pole of the rotor of embodiment of FIG. 1.

Before describing an embodiment of an electrostatic motor according to the present invention, the following considerations concerning the source of the electric force must be understood.

When having two plates of 50 by 50 cm square being 1 cm apart from each other with a 25 kV of potential difference (+12.5 and −12.5 kV respectively), the exerted force on each plate is equal to approximately 6.9 Newtons. Obviously, this provides a negligible work over a 1 cm distance. Consequently, the exerted force on the plates must not be considered. Instead, the stored energy made available in the electric field between the fixed plates must be used.

Accordingly, a third moving plate, of same size than the other two that can freely move between both two fixed plates while remaining parallel to the latter and allowing for an electric contact with either of the fixed plates when the moving plate reaches it, is added.

When the moving plate touches one of the fixed plates, the anode (+) or the cathode (−), it will reach the same electric charge as the latter, being −12.5 kV by touching the cathode, for example. At this moment, there is repulsion from the cathode on the moving plate and attraction toward the anode. Then the moving plate leaves the cathode with this negative charge heads for the anode to ultimately touch the latter, the charge of the mobile plate therefore changes and the opposite displacement starts toward the cathode.

The moving plate oscillates this way from a fixed plate to the other as long as the electric voltage source supplies the necessary charges to maintain a constant potential difference between both fixed plates, consequently, a constant electric field between the two poles. Therefore, the moving plate oscillates between both the anode and the cathode with a constant force of 6.9 Newtons, exactly the same force as the one exerted on both anode and cathode. In this manner, 100% of the available energy in the electric field is directly transferred into a mechanical power and movement.

As the moving plate continuously changes charge, the same result could conceivably be obtained by either isolating the fixed anode (+) and cathode (−) plates from the moving one and applying an alternating voltage on the moving plate, or applying either a positive or a negative static charge on the moving plate and alternating the potential difference between the fixed plates.

The above principles allow for realizing electrostatic piston motors by coupling different moving plates to a crankshaft. Even though this is interesting in theory, the electrostatic piston motor comprises volume constraints and is mechanically complicated; but there is way to have a lot better and simpler. Starting from this simple motor utilizing a moving plate oscillating between two fixed plates, the same principle can be adapted to provide efficient electrostatic motors, as explained hereinafter.

To realize efficient motors with above principles, it is required to get a continuous movement of the moving plate rather than a forward-backward oscillating motion and to keep the moving plate substantially parallel to the fixed plates. This could be made possible by having a physical plate pass "through" a plurality of successive ones.

Furthermore, if a plate, or plane, is charged and fixed, any other moving plane of opposite charge and facing it will inevitably be attracted by this fixed plane. If that moving plane could pass "through" the first one and produce an electric exchange such as a spark at the crossing, once on the other side, it would be of a same charge as the fixed plane, would then be repealed by the latter and continue accelerating. By arranging successive fixed planes with alternating positive and negative charges to provide continuous unidirectional displacement of the moving plane, an efficient motor can be produced.

Referring to FIGS. 1 to 13, there is shown a first embodiment 20 of an electrostatic motor according to the present invention. The motor 20, as any standard motor, consists of a fixed section, the stator member 22, preferably surrounding a moving section, the rotor member 24 fixedly secured to a shaft member 25. The term "standard motor" refers to any AC or DC motor that uses the magnetic field as driving power.

Both stator 22 and rotor 24 are preferably cylindrical in shape and essentially formed by a plurality of respective poles 26, 28 axially oriented and circumferentially equally spaced apart around their respective cylinders 30, 32 that are coaxial.

As explained above, in order to have the rotor poles 28 forming so-called moving planes passing through each of the stator poles 26 being the fixed planes, all the planes are in the form of combs.

Each comb-pole 26, 28 generally consists of a plurality of similar, coplanar and parallel respective teeth 34, 36, preferably elongated and cylindrical in shape, equally spaced apart from each other and held together at a base extremity 38 via a substantially respective rigid member 40, 42. Preferably, the spacing between every two adjacent teeth 26, 28 varies form 105% to 120% of their diameter in such way that each tooth 36 of a moving comb-pole 28 can freely pass inbetween two facing adjacent teeth 34 of a fixed comb-pole 26 without any physical contact.

Figure 5:
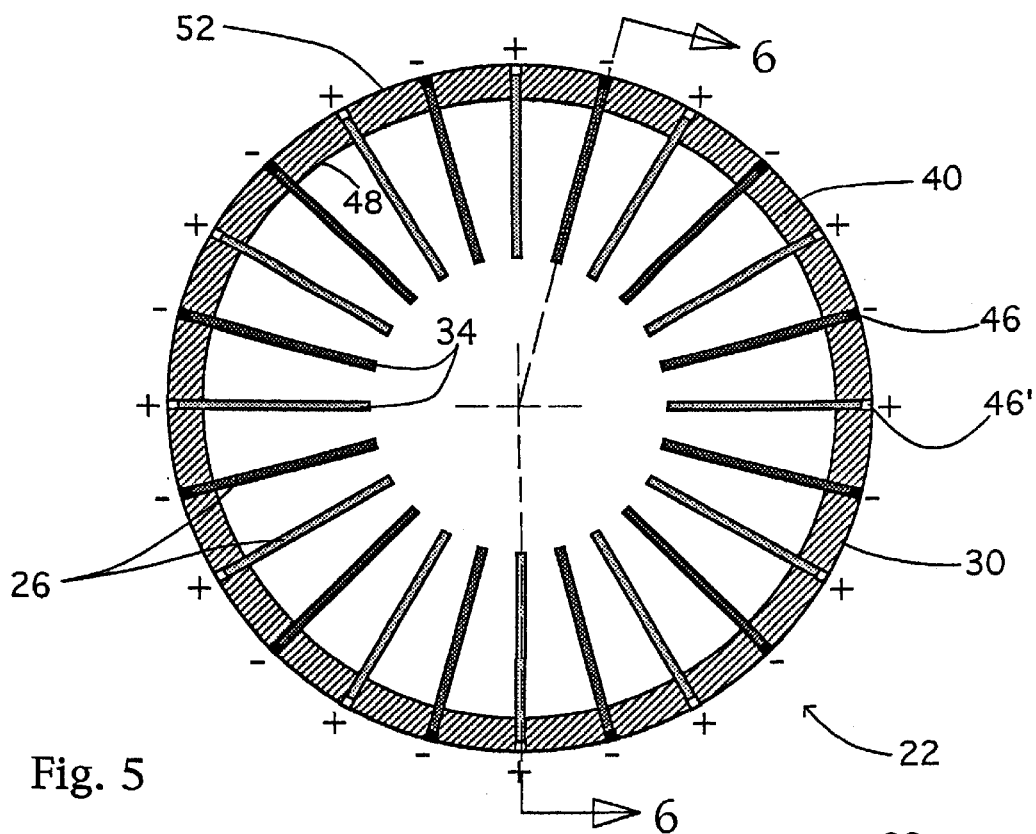
FIG. 5 is a side view of the stator of embodiment of FIG. 1.
Figure 6:
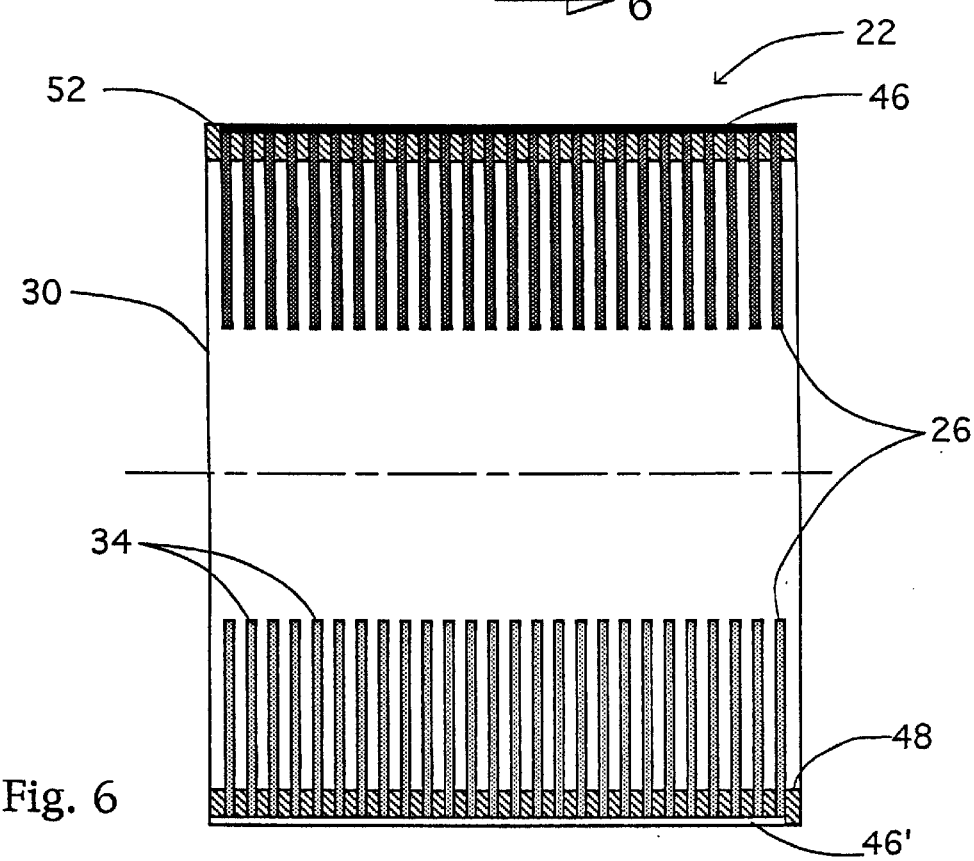
FIG. 6 is a section view taken along line 6—6 of FIG. 5.
Figure 7:
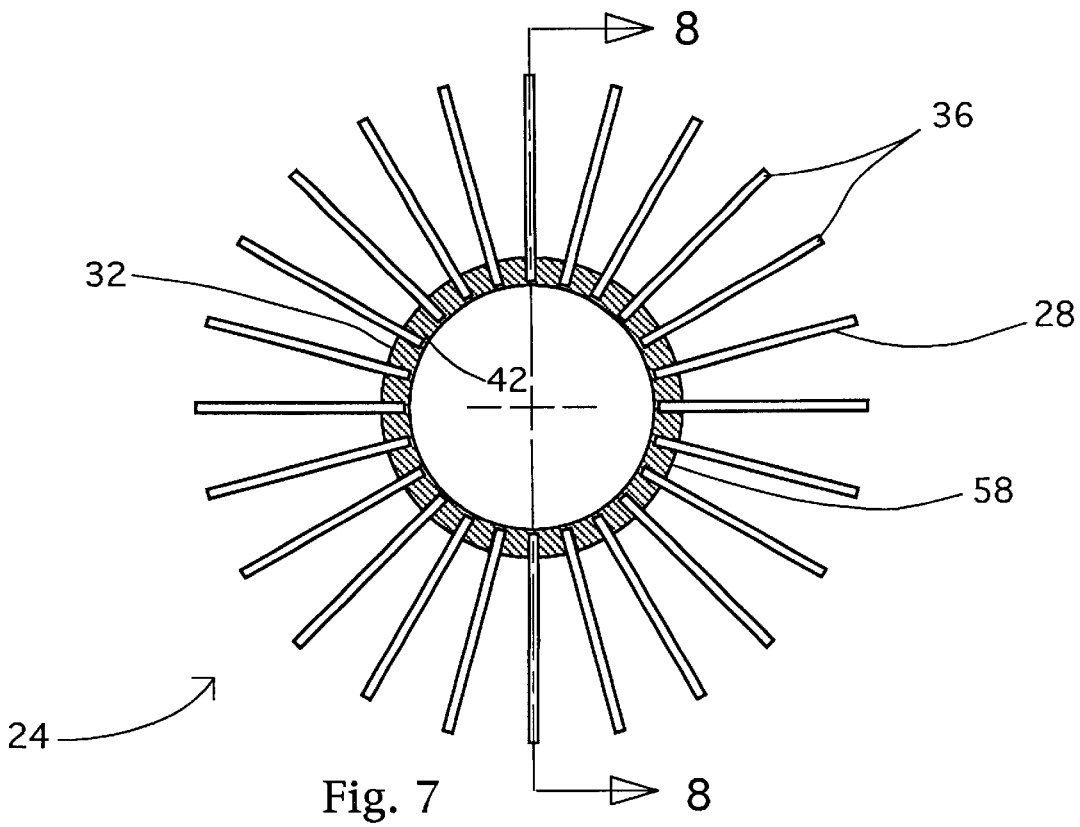
FIG. 7 is a side view of the rotor of embodiment of FIG. 1.
Figure 8:
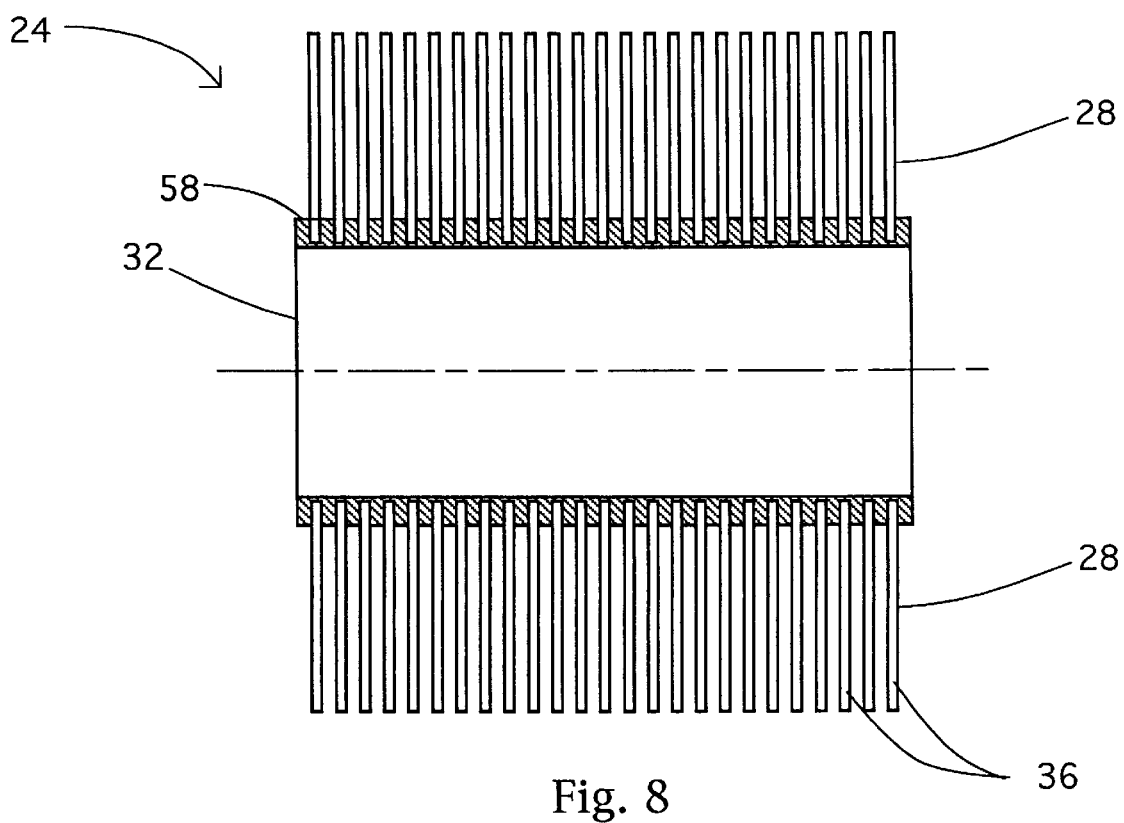
FIG. 8 is a section view taken along line 8—8 of FIG. 7.

For the DC motor, an even number of stator comb-poles 26 that are respectively alternately connected to the positive and negative polarities of a constant voltage source, as illustrated in FIG. 5. All teeth 34 of a same stator comb-pole 26 are made out of an electrically conductive material and are electrically connected to each other via a stator conductor member 46, 46' (primed numerals refer to another polarity or phase, for clarity purposes). As shown in FIGS. 5 and 6, the stator comb-poles 26 are preferably inwardly radially protruding from the inner surface 48 of the electrically insulating hollowed cylinder 30; such that the conductor members 46, 46' are axially oriented and preferably positioned at the radially outermost extremities of the teeth 34. As an example, twenty-four (24) stator and rotor comb-poles 26, 28 are shown on FIGS. 5 and 7 respectively.

The teeth 34 of each stator comb-pole 26 are preferably radially inwardly inserted through the hollowed cylinder 30 acting as the rigid member 40 and are electrically linked to the respective axial conductor member 46, 46' preferably located inside a respective axial groove 50 machined on the outer surface 52 of the cylinder 30. As shown on FIGS. 2, 6, 9 and 13, axial conductor members 46, 46' are preferably alternately slightly protruding out from a respective axial extremity of the cylinder 30 and electrically connected to a conductive ring member 54, 54' respectively preferably embedded into a respective cover 56 adapted to close that extremity of the cylinder 30. Each conductive ring 54, 54' is in-turn connected to a polarity of the voltage source.

Figure 9:
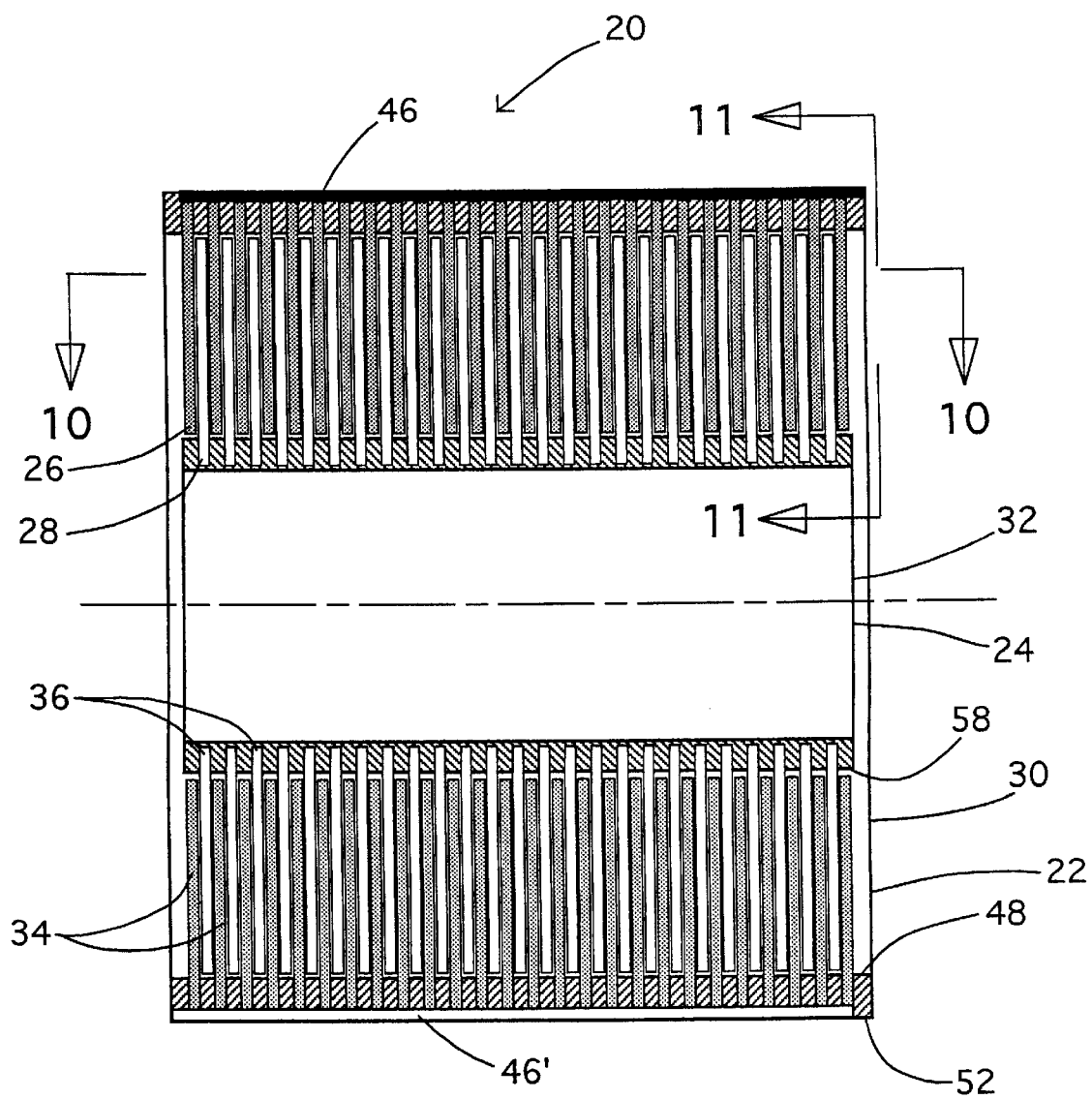
FIG. 9 is a section view of the rotor of FIG. 7 inserted into the stator of FIG. 5.

Similarly, the rotor 24 consists of an insulating cylinder 32 (see FIGS. 7 and 8) acting as the rigid member 42 from which the teeth 36 of the different comb-poles 28 are preferably outwardly radially protruding from an outer surface 58. Preferably, the quantity of comb-poles 28 is the same of that of stator comb-poles 26. The rotor 24 is axially inserted into the stator 22 to ensure that rotor comb-poles 28 are aligned in such a way that they pass through the stator comb-poles 26, as shown in FIG. 9. Preferably, all teeth 36 of a same rotor comb-pole 28 are electrically insulated from each other and independently electrically "floating". Each tooth 36 can independently be seen as a rod that is repealed by the stator comb-pole 26 that it has just passed through, from which it has obtained its electric charge and that is attracted by the following in-line comb-pole 26 it is heading to.

Each rotor tooth 36 obtains its charge by passing between two stator comb-pole teeth 34. As explained hereafter, the electric exchange occurs without physical contact between the teeth 34, 36. Since the voltage source provides the charges to each rotor tooth 36 independently via the stator comb-poles 26 by a tiny electric spark, the rotor teeth 36 therefore act at the same time as part of the usual collector devices, without any friction.

Figure 10:
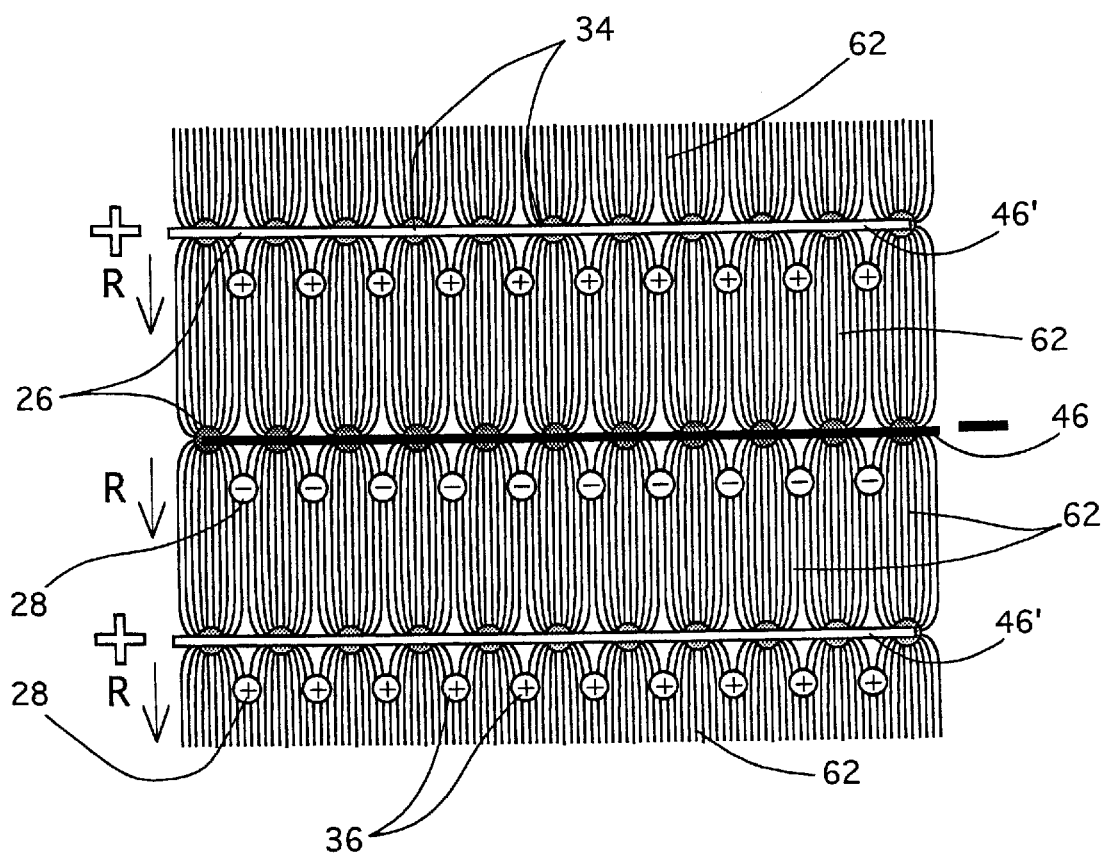
FIG. 10 is an enlarged tangential section view taken along line 10—10 of FIG. 9 and showing a planar projection of a tangential arc section including three stator comb-poles and three corresponding rotor comb-poles (downwardly moving), as well as the uniform electric fields formed between adjacent stator comb-poles.

The above principle is better described by FIG. 10 showing a circumferential distribution view of the electric field created between the adjacent stator comb-poles 26. In this figure, there is shown a negative stator comb-pole 26 inbetween two adjacent positive ones with the electric fields therebetween represented by solid lines (for clarity, the cylinders 30, 32 are not shown). The stator axial conductor members 46, 46' are shown as being alternately protruding at both extremities of the stator 22. The radially outermost extremity, the tip 60, of the teeth 36 of the each rotor comb-pole 28 heads in the direction of the arrows R such that each tooth 36 is of the same charge than the respective stator comb-pole 26 it moves away from.

As the field lines of a same stator comb-pole 26 strongly repeal each other from adjacent teeth 34 but on the other hand are attracted by the adjacent comb-poles 26, the field between the poles 26 quickly becomes uniformly distributed in a central zone 62 therebetween. In these zones 62, that approximately occupy 80% of space between adjacent poles 26, the moving teeth 36 of the rotor 24 are subjected to a constant force, whatever their speed may be. In order to get an efficient size of zone 62 where the field is uniform, the diameter of teeth 36 is preferably less than 10% of the distance between adjacent comb-poles 36.

In the region closer to the poles 26, the field lines converge toward the teeth 34. This produces an increase of the electric field intensity in this region thereby enhancing the electric exchange between each rotor tooth 36 and its close comb-pole 26 without real physical contact.

Due to the fact that both the charge of the rotor teeth 36 does not change during their respective displacement between two stator comb-poles 26 and that the electric field is uniform, the voltage between a rotor tooth 36 and the next comb-pole 26 decreases as the tooth 36 approaches the latter. But when the electric field increases in close proximity to the comb-pole teeth 34, the voltage stops decreasing. The electric exchange substantially occurs at this moment. The intensity of the field close to the comb-pole teeth 34 tends to be twice as elevated as it is in zone 62.

Therefore, the minimum operating voltage is essentially the voltage required to produce an electric exchange between the rotor teeth 36 and the stator comb-poles 26 while crossing each other.

The stator comb-pole teeth 34 are entirely covered with a thin insulating coat material 64 (shown in hatched area in FIG. 11) except at their base extremity 38 close to inner surface 48 of the cylinder 30 left uncovered. The axial conductor members 46, 46' are also preferably covered with some insulating material at the outer surface 52 of the cylinder 30. This additional insulating coat material 64 eliminates any losses due to air ionization losses and allows for operating the motor 20 at higher voltages. The uncovered base extremity 38 forces the spark to occur at that location that is preferably of less than 1 mm in length.

The electric charges that are carried by the rotor comb-poles 28 generate the electric current. Since the motor 20 operates at high voltages, the current is essentially very low for a given power, in the order of a few micro-amps per watt. Considering the fact that there are hundreds of teeth 34 for a given rotor 22, each one of them therefore carries a current of a few nano-amps per watt. This current does not really circulate but is rather carried by the stator teeth 34. This allows the motor 26 not to heat during operation.

The electrostatic motor 20 of the present invention can turn in both directions of rotation. The required direction of rotation is therefore imposed by either by a slight swing before applying the voltage to the motor 20 or for example, by leaving uncovered preferably only a same circumferential half side of the base extremity 38 of the teeth 34, on which the spark will occur. The rotor teeth 36 will then move away from that uncovered half circumference at the base 38, thereby inducing a direction of rotation.

The motor 20 of the present invention is capacitive rather than inductive like standards motors, the most complex aspect is to determine its capacitance. In order to obtain the latter, it is necessary to know first the capacitance formed between two teeth 34 of adjacent comb-poles 26. For two conductors of length L, of diameter d and at a distance D from each other, it is known that the capacitance C in Farads is:

$$C = 12 * 10^{12} * Er * L / \log(2D/d)$$

where Er is the dielectric constant and equals 1 for air.

As the teeth 34 are not perfectly parallel to each other and their circular cross-section, the distance between their respective axis at mid-length is considered for the value of D. The following is all calculated from this capacitance C. First, the motor total capacitance Cm is the capacitance C between two teeth 34 multiplied by the number of teeth Nt per pole, multiplied by the total number of comb-poles 26, 28 Np divided by two (2).

$$Cm = C * Nt * Np / 2$$

In practice, the measured total capacitance is slightly higher than the one calculated in theory. The difference is due the parasitic capacitance of the axial conductor members that feed the comb-poles 26 as well as the dielectric constant of the cylinder 30.

With the motor capacitance Cm, the current I is calculated for a given voltage U and a rotation speed V. The electrical power is determined with this current.

It is known that the electric current is equal to the quantity of charges Q, in Coulombs, carried in one second. As there is electric exchange at each crossing of the rotor comb-poles 28 through the stator ones 26, this is equivalent to alternately charging and discharging Cm. So, at each complete rotation, Cm will be charged as many times as the total number of rotor comb-poles 28 divided by two (2).

As charge Q is equal to the voltage U multiplied by the capacitance Cm, then the current I equals the voltage U multiplied by Cm, multiplied by the total number of comb-poles Np divided by 2, multiplied by the rotation speed V in RPM (Rotations Per Minute) divided by sixty (60) (conversion to rotations per second since the current is defined in Coulombs per second).

$$I=U*Cm*Np/2*V/60$$

As the electrical power Pe=U*I, one can write:

$$Pe=U^2*Cm*Np/2*V/60$$

It is also known that the mechanical power Pm equals the rotation speed V in RPM multiplied by the torque T in N*m (Newton-meter) multiplied by 0.10472, a factor taking units into account.

$$Pm=0.10472*V*T$$

Since the formula giving the torque T is T=F*R with the average radius R measured from the center of the rotor 24 to the center of the stator teeth 34. The force F is obtained from Cm using the following formula:

$$F=Cm*U^2/2D$$

to finally get the torque:

$$T=R*Cm*U^2/2D$$

and the mechanical power:

$$Pm=0.10472*V*R*Cm*U^2/2D$$

The following provides an example of typical dimensions and resulting torque and mechanical power using the above described formulas.

| | |
|---|---|
| Stator cylinder diameter | 0.4064 meter |
| Stator cylinder length | 0.6096 meter |
| Teeth diameter | 0.003175 meter |
| Number of poles | 48 |
| Rotation speed | 4800 RPM |
| Teeth length | 0.1143 meter |
| Average distance pole to pole | 0.0191179 meter |
| Radius at center of teeth | 0.14605 meter |
| Number of teeth per pole | 80 |
| Motor total capacitance | 3.22E-09 Farad |
| Voltage supply | 30000 Volts |
| Current | 185.28 mA |
| Electrical power | 5558.82 Watts |
| Torque | 11.03 Nm |
| Mechanical power | 5558.82 Watts |
| | 7.46 HP |
| | 6.0 HP (considering 80% efficiency) |

The motor 20 of the above example may seem big considering its output power when compared to an equivalent standard motor. However, it is significantly lighter since it is preferably essentially made out of aluminum teeth 34, 36 and two plastic cylinders 30, 32. The rotor cylinder 32 can also preferably be hollowed and that available space may be wisely used. Also, the quantity of rotor comb-poles 28 could preferably be modified to optimize the motor output power to volume ratio. The optimum ratio depends on dimensions, source voltage and required output power.

Moreover, if the quantity of rotor comb-poles 28 is not a multiple of the quantity of stator comb-poles 26, for example there is one more comb-pole 28 on the rotor 24, the simultaneous comb-poles charging/discharging occurrences will be avoided. The comb-poles 26 would successively charge in turn thus avoiding current surges; thereby reducing electrical noise in the power source as well as electromagnetic interference (EMI).

For an optimum output power/volume ratio and a high efficiency electrostatic motor 20, the following considerations, also applicable to the AC motor described further unless otherwise specified, are recommended, as preference.

Figure 11:
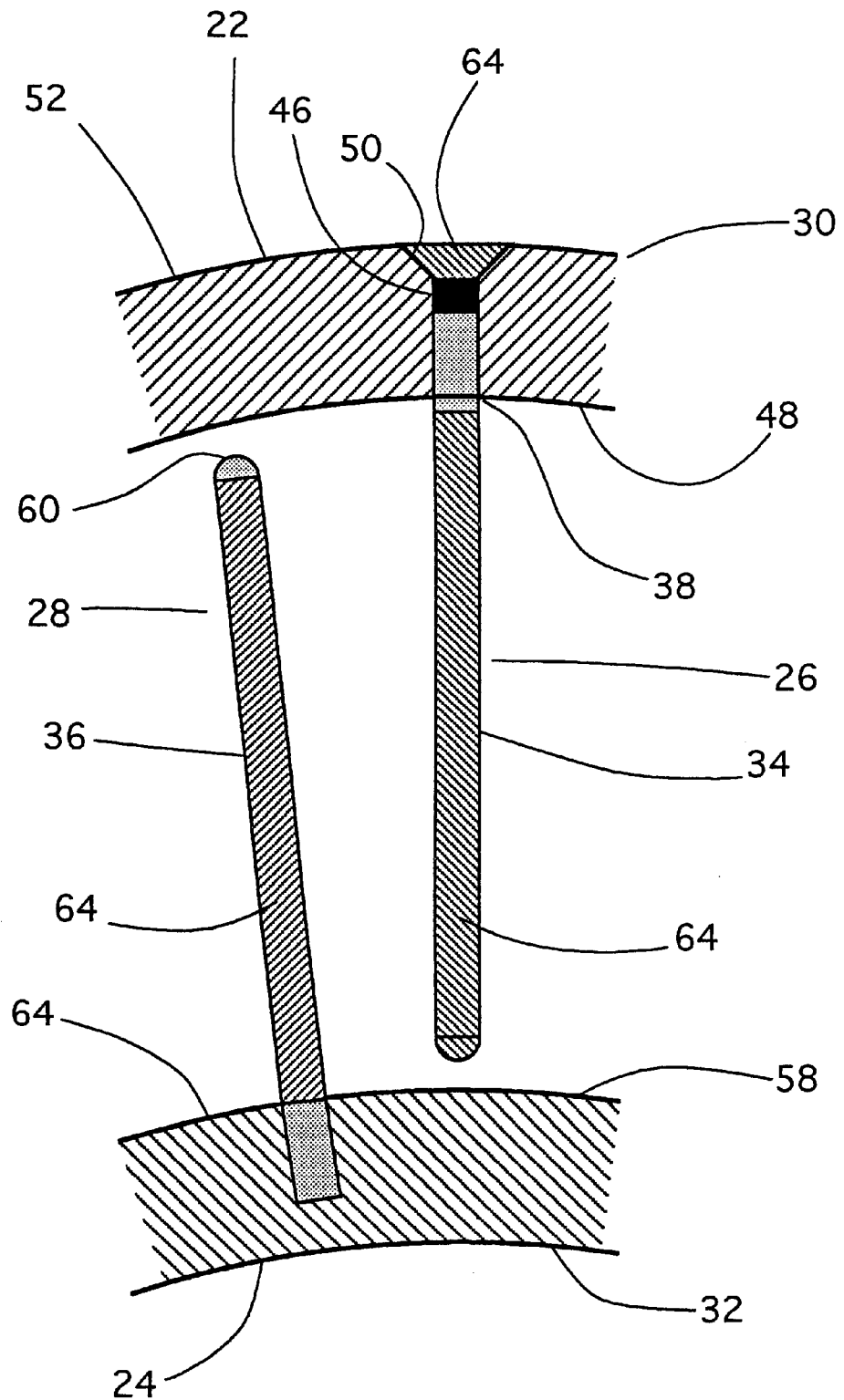
FIG. 11 is an enlarged radial section view taken along line 11—11 of FIG. 9 and showing details of the teeth of both stator and rotor comb-poles of embodiment of FIG. 1.

As shown on FIG. 11, the axial conductor members 46 in grooves 50 of the outer surface 52 of outer cylinder 30 are preferably covered with the insulating coat material 64.

The rotor teeth 36 are preferably also fully covered with an insulating coat material 64 except for the radially outermost tip extremity 60 region left uncovered. By insulating the rotor teeth 36, any "bridge" effect that a rotor tooth 36 could create when being inbetween two stator comb-poles 26 is avoided. Preferably, the innermost extremity base 38 region of the rotor teeth 36 do not inwardly protrude from the preferably hollowed inner cylinder 32 to eliminate any possible electric sparks.

All the teeth 34, 36 are preferably made out of aluminum, substantially cylindrical and smooth with rounded exposed extremities prior to additional application of an insulating coat material 64, to minimize any point effect ionization. Aluminum, in addition to its lightweight, is a non-ferromagnetic material that reduces any induction and Eddy current losses. Any other non-ferromagnetic material would also be acceptable. The distance between a rotor tooth 36 and a stator tooth 34 when they cross each other is preferably as small as possible, without touching each other, to reduce the minimum operating voltage. The inner 48 and outer 58 surface of the outer 30 and inner 32 cylinder respectively are preferably slightly wavy to decrease the risk of leak surface currents that might be created thereon.

The insulating parts, such as both cylinders 30, 32 and insulating coat material 64 are preferably made out of high dielectric constant and lightweight materials such as acrylic based materials and the like. Materials such as ceramics could also be used for the teeth insulation; for high voltage, ceramics are acceptable and provide an excellent electric insulation with a very thin coat. As it would be obvious to anyone skilled in the art, standard motor covers, ball bearings 66 and common shaft 25 are preferably used to properly structurally, along with safety consideration, complete the electrostatic motor 20.

Figure 12:
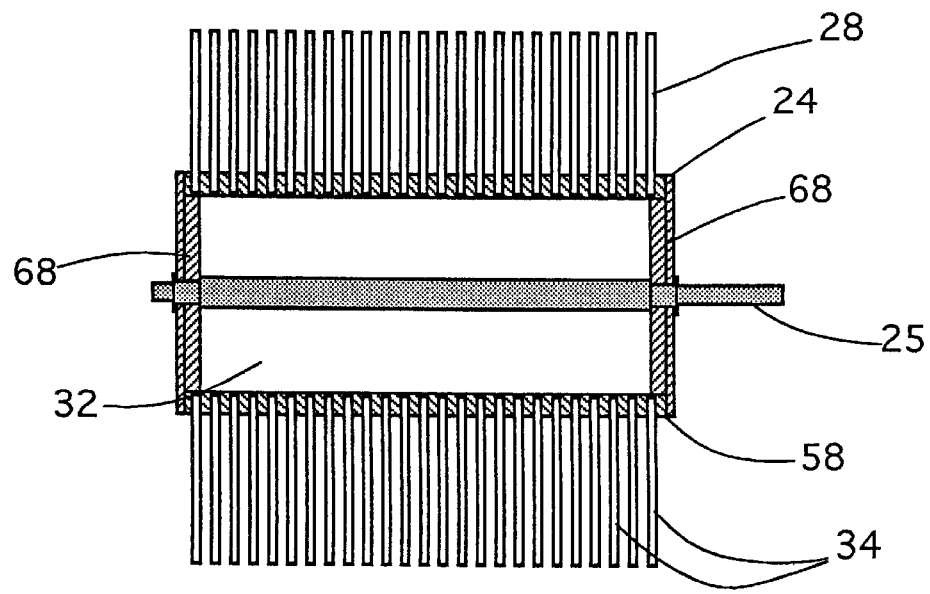
FIG. 12 is a view similar to FIG. 8 showing the rotor with its covers and the shaft.

As shown in FIG. 12, the rotor 24 also preferably includes cylinder extremity covers 68 that fixedly support the shaft 25. The shaft 25 could also be an integral part of the inner cylinder 32. As the rotor 24 is unusually light and the motor 20 produces a constant torque whatever the rotation speed is, it is required to pay attention to an eventual racing of the motor when the latter will operate without any load.

Figure 13:
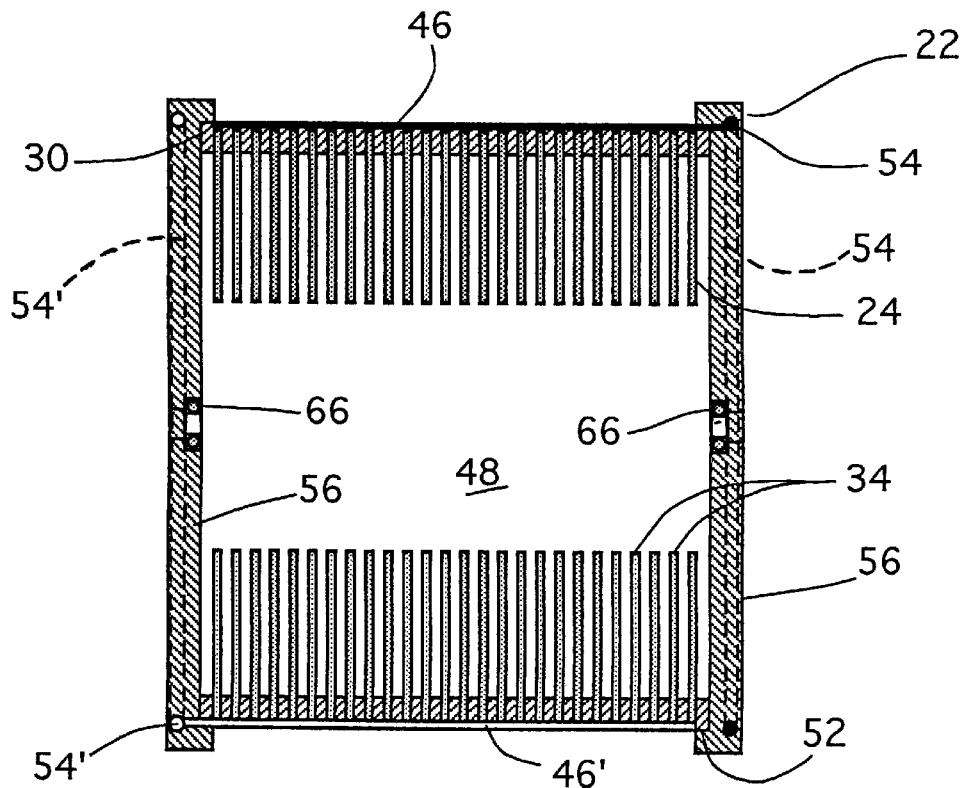
FIG. 13 is a view similar to FIG. 6 showing the stator with its covers with corresponding conductive rings and ball bearings.

As shown in FIG. 13, the cylinder covers 56 of the stator 22 carry respective ball bearings 66 to rotatably jointly support the rotor 22 and the shaft 25 members. The conductive rings 54, 54' embedded into their respective cover 56 are also shown. This motor 20 is supplied with a voltage source applied to these two rings 54, 54' at its two extremities.

Based on the above, it is obvious that in order to ensure a highly efficient electrostatic motor 20, high precision machining of the different parts is preferable.

Figure 14:
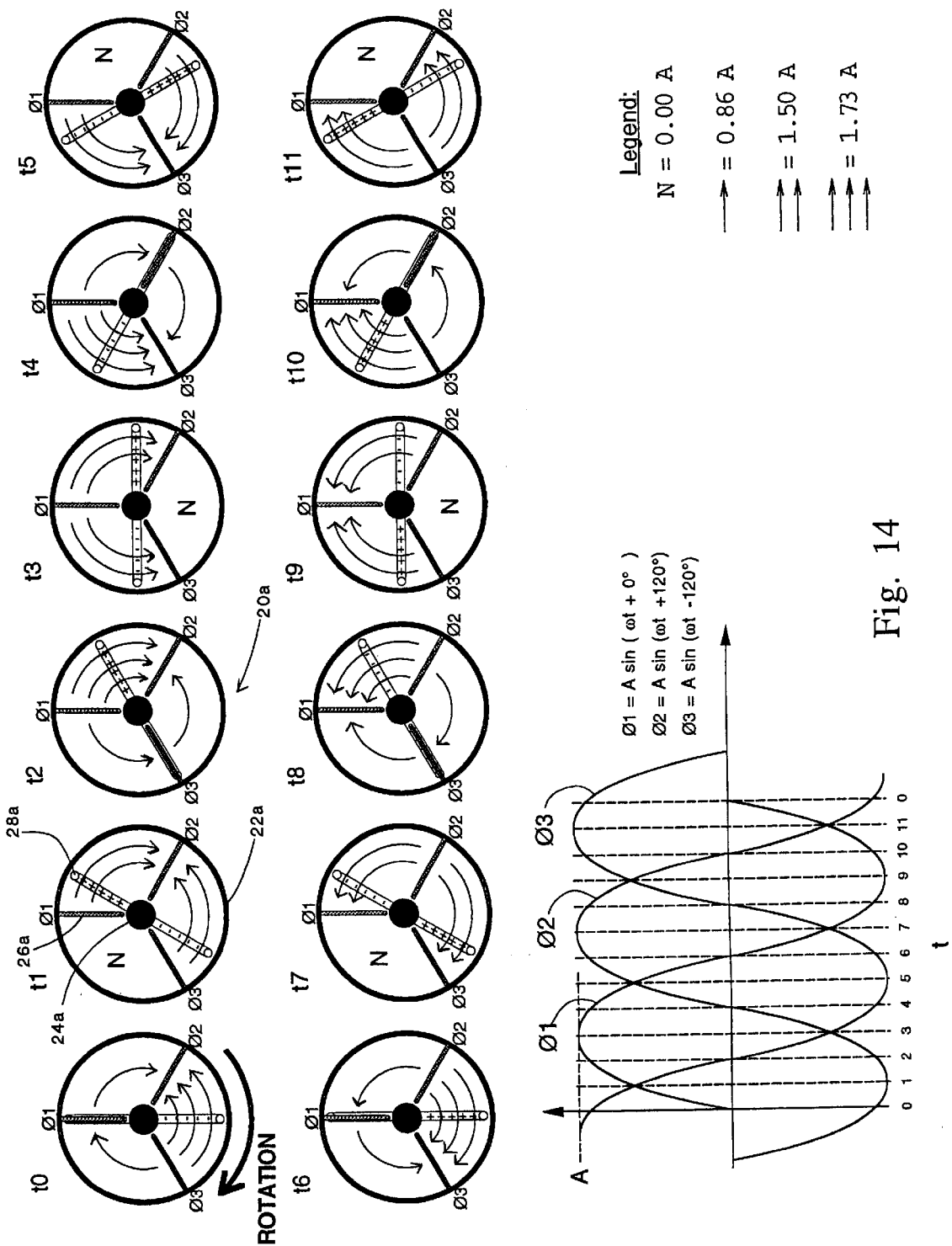
FIG. 14 shows a schematic chart with corresponding pictorials used to explain the rotation of the rotor along with the rotating electric field of a second embodiment of a three-phase AC (Alternating Current) electrostatic motor according to the present invention.
Figure 15:
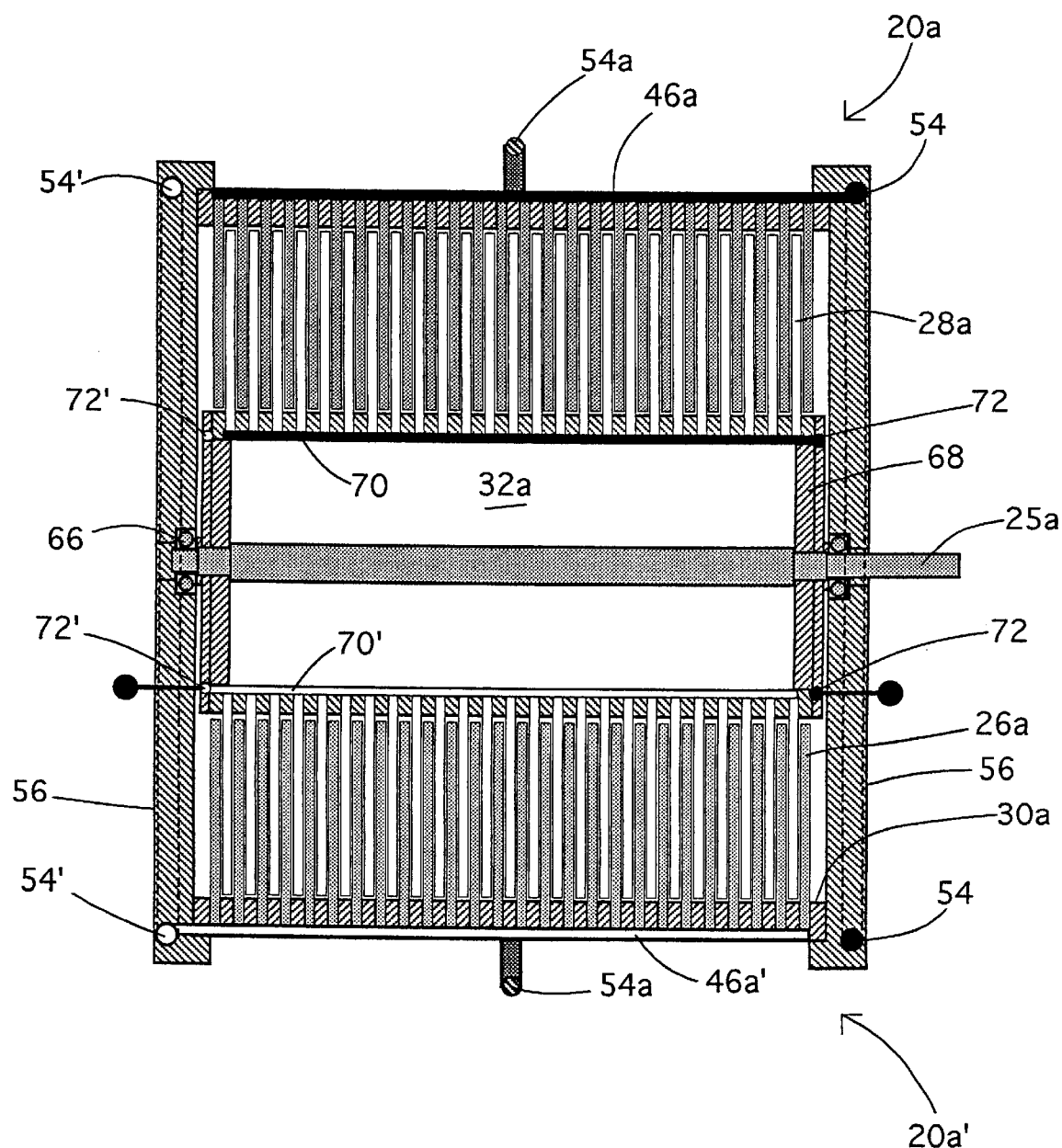
FIG. 15 is a view similar to FIG. 2 of the second embodiment of FIG. 14 showing the location of the electrical contacts for the different conductive rings.

Referring to FIGS. 14 and 15, there is shown a second embodiment 20a of an electrostatic motor according to the present invention. This motor is adapted to be supplied with a standard three-phase alternating voltage source. The major difference from the first embodiment 20 mainly relates to the power supplying the stator comb-poles 26a. Instead of alternately connecting the stator comb-poles 26 to positive (+) and negative (−) voltage supplies, the latter are alternately distributed in three phases Ø1, Ø2 and Ø3 by feeding of course the same number of comb-poles 26a for each phase.

To better visualize this embodiment 20a, FIG. 14 schematically represents only one trio of stator comb-poles 26a Ø1, Ø2 and Ø3 and two rotor comb-poles 28a. The different schematics show the three comb-poles 26a identified with Ø1, Ø2 and Ø3 along with the timely variations of the electric field created between the latter three with respective intensity ("A" is the maximum peak voltage of any phase of the voltage source) and direction symbolized with curved arrows, at twelve different moments "t0" to "t11" equally dividing a full 360° cycle of Ø1 in twelve intervals of 30° each, as shown in dashed lines in the corresponding graph of the three sinusoidal voltage phases.

The observation the field variation at the twelve moments "t0" to "t11" shows that this electric field does rotate around the axis. The concept of rotating field, being commonly used for standard three-phase motors, is not described herein. However, it is important to mention that the present rotating electric field is perpendicular to the comb-poles 26a, 28a or tangential, and not radial, as opposed to standard three-phase motors. Therefore, the rotor comb-poles 28a, once electrically charged, are being "pushed" by the rotating field, thus inducing rotation of the rotor 24a. The direction of rotation reverses by switching any two phases of the voltage source, similarly to standard three-phase motors.

The rotor 24a is represented in FIG. 14 with a solid circle at the center of the stator 22a and two rotor comb-poles 28a, one positive and one negative. Only two comb-poles 28a are preferably represented since at least one pair of comb-poles 28a at the rotor 24a is required for each trio of comb-poles 26a at the stator 22a. For example, if the stator 22a contains thirty-six comb-poles 26a alternately connected in three groups, the rotor 24a preferably includes twenty-four comb-poles 28a. This allows for the force exerted on the rotor comb-poles 28a to always be in the same direction (clockwise in this example of FIG. 14) and never have any comb-pole 28a inbetween two adjacent stator comb-poles 26a when the electric field is nil (N).

The positive and negative static charges on the rotor comb-poles 28a are preferably acquired in two different methods, as described below.

Firstly, similarly as in the DC motor 20, via tiny sparks between stator 26a and rotor 28a comb-poles, with the difference that as the rotor 24a speeds up or accelerates, the sparks frequency decreases, until the rotor 24a reaches the speed of the rotating field. This method provides, by analogy with the standard motors, an asynchronous motor 20a. This embodiment 20a is physically very similar to the first embodiment 20 above described, besides the preferably 3/2 stator-to-rotor comb-poles ratio, and a third conductive ring member 54a (see FIG. 15) preferably located axially inbetween the other two rings 54, 54' to supply the third phase from the alternating voltage source to the third group of comb-poles 28a.

Secondly, in electrically isolating the teeth 36 of the rotor 24a from the stator comb-poles 26a by fully covering all teeth 34, 36 to eliminate any possibility of spark between the two. As shown in FIG. 15, axial rotor conductor members 70, 70' electrically connect the all innermost base extremities 38 of all teeth 34 of a same rotor comb-pole. Preferably, these conductor members 70, 70' are alternately slightly protruding out on their respective axial extremity of cylinder 32 to electrically connected to a respective conductive ring member 72, 72' preferably embedded into its respective inner cylinder cover 68. The two ring members 72, 72' being respectively statically electrically charged by a positive and a negative charge via a respective electrical contact preferably reachable through the stator covers 56. Besides the rotor charge current at ignition, once the teeth 36 are charged, there should not be any current circulating in these rings 72, 72' if the rotor 24a and its comb-poles 28a are properly insulated. This method provides, still by analogy with standard motors, a synchronous motor 20a'. This requires that this motor 20a' needs to be brought to synchronous speed with the rotating field before applying the alternating voltage source when used as motor.

These electrostatic motors 20, 20a, 20a' of the present invention do totally operate differently than the standard motors. For example, for the DC motor 20, if we stall the rotor 24, the current drops to zero as opposed to the conventional motor. As a matter of fact, everything is exactly the opposite as it is for inductances versus capacitors. Principles are quite complementary.

The following is short comparison between standard and electrostatic DC motors.

| DC Standard Motor | DC Electrostatic motor |
| --- | --- |
| Inductive motor | Capacitive motor |
| Rotation speed depends on voltage | Rotation speed depends on current |
| Torque depends on current | Torque depends on voltage |
| Current is MAX at stalling and at starting | Current is MIN at the stalling and at starting |

So, the DC electrostatic motor 20 is inevitably more advantageous in certain situations such as when a constant torque is required independently of the rotation speed. Whatever the rotation speed, the torque always remains the same, allowing for reaching significant output powers considering the lightweight that these motors 20 will be.

This DC motor 20 efficiently converts any electrostatic source into mechanical power. As any natural electric source is in electrostatic form, it is obvious that this becomes interesting as a directly usable source of energy. An example of a particularly interesting application of such an electrostatic motor 20 would be in the aerospace technology for the conversion of the high energy potentials accumulating on metallic surfaces under the photoelectric effect, from the electromagnetic radiation from the Sun and deep space. The DC motor 20 would be used in conjunction with an electrostatic synchronous machine 20a' used as generator. The lightweight of these motors 20, 20a, 20a' associated with their higher available output power, especially under vacuum condition, are obvious reasons to seriously consider them for multiple aerospace applications as simple DC or AC motors.

The present high efficiency AC and DC electrostatic motor has been described with a certain degree of particularity. It is to be understood that the disclosure has been made by way of example only and that the present invention is not limited to the features of the embodiments described and illustrated herein, but includes all variations and modifications within the scope and spirit of the invention as hereinafter claimed.

I claim:

1. An electrostatic motor device comprising:

a stator member including a plurality of pole members circumferentially equally spaced apart around an inner surface of an electrically insulating hollowed outer cylinder, each pole member includes a plurality of inwardly radially protruding and equally spaced apart electrically conductive elongated teeth along an axial direction of said hollowed cylinder, all teeth of a same pole member being electrically connected to each other at their respective radial outermost extremity by an axial stator conductor member, every one of said stator conductor members being alternately electrically connected together to corresponding ones of said stator conductor members to form at least two electrically isolated alternating groups, each of said groups being adapted for electrically connecting to a different polarity of a voltage source, said teeth of said stator pole members being fully covered with an insulating coat material except for their respective base region in proximity of said inner surface of said outer cylinder;

a rotor member including a plurality of pole members circumferentially equally spaced a part around an outer surface of an electrically insulating inner cylinder rotatably supported to and coaxial to said outer cylinder, each pole member includes a plurality of outwardly radially protruding and equally spaced apart electrically conductive elongated teeth along said axial direction, said teeth of said stator pole members being adapted for having corresponding teeth of said rotor pole members freely moving therebetween; and a shaft member secured to said rotor member and coaxial to both said cylinders; said shaft member rotating along with said rotor member upon application of said voltage source to said stator pole members.

2. A motor device as defined in claim 1, wherein each of said teeth of both said stator and rotor pole members are substantially cylindrical in shape.

3. A motor device as defined in claim 1, wherein the distance between two adjacent of said teeth of said stator pole members is substantially sized slightly larger than one of said teeth of said rotor pole members thereby ensuring no physical contact between corresponding stator and rotor teeth during rotation of said rotor member.

4. A motor device as defined in claim 1, wherein said voltage source is a constant voltage source, said stator member has an even number of pole members with every second of said stator conductor members being alternately electrically connected together to form two alternating groups, each of said groups being adapted for electrically connecting to a different polarity of said constant voltage source, thereby creating constant electric fields between two adjacent stator pole members, said teeth of said rotor pole members being simultaneously charged via electric sparks when getting in close proximity to a respective one of said stator pole members and being displaced towards an adjacent of said stator pole members under said constant electric field.

5. A motor device as defined in claim 4, wherein said rotor member has an odd number of pole members.

6. A motor device as defined in claim 4, wherein said teeth of said rotor pole members are fully covered with said insulating coat material except for their respective tip region moving closely to said base region of said teeth of stator pole members, thereby forcing said electric sparks to occur between respective uncovered regions.

7. A motor device as defined in claim 6, wherein each of said teeth of both said stator and rotor pole members are substantially cylindrical in shape.

8. A motor device as defined in claim 4, wherein said outer cylinder includes two electrically conductive ring members each interconnecting one of said groups of said stator conductor members to a respective polarity of said constant voltage source.

9. A motor device as defined in claim 8, wherein said ring members are each located at a respective axial extremity of said outer cylinder.

10. A motor device as defined in claim 1, wherein said voltage source is an alternating three-phase voltage source, said stator member having a plurality of trio of pole members, every third of said stator pole members being alternately electrically connected together to form three alternating groups, each of said groups being adapted for electrically connecting to a different phase of said three-phase voltage source, thereby creating an electric field rotating around said axial direction between said stator pole members, said rotor member having at least one corresponding pair of pole members for each said trio of stator pole members, said teeth of said rotor pole members being simultaneously charged via electric sparks when getting in close proximity to a respective one of said stator pole members and being displaced towards an adjacent of said stator pole members under said rotating electric field, said electric sparks occurring at a frequency that gradually decreases until said rotor member reaches the rotating speed of said rotating electric field, thereby said electric motor device being an asynchronous type motor.

11. A motor device as defined in claim 10, wherein said rotor member has only one corresponding pair of pole members for each said trio of stator pole members.

12. A motor device as defined in claim 10, wherein said teeth of said rotor pole members are fully covered with said insulating coat material except for their respective tip region moving closely to said base region of said teeth of stator pole members, thereby forcing said electric sparks to occur between respective uncovered regions.

13. A motor device as defined in claim 10, wherein said outer cylinder includes three electrically conductive ring members each interconnecting one of said groups of said stator conductor members to a respective phase of said three-phase voltage source.

14. A motor device as defined in claim 13, wherein two of said ring members are each located at a respective axial extremity of said outer cylinder, the third ring member is equally spaced apart from and inbetween the other two ring members.

15. A motor device as defined in claim 1, wherein said voltage source is an alternating three-phase voltage source, said stator member having a plurality of trio of pole members, every third of said stator pole members being alternately electrically connected together to form three alternating groups, each of said groups being adapted for electrically connecting to a different phase of said three-phase voltage source, thereby creating an electric field rotating around said axial direction between said stator pole members, said rotor member having at least one corresponding pair of pole members for each said trio of stator pole members, all teeth of a same rotor pole member being electrically connected to the others at their respective radial innermost extremity by an axial rotor conductor member, every second of said rotor conductor members being alternately electrically connected together to form two electrically isolated alternating sets, said sets being adapted for electrically connecting to a positive and a negative polarities of a constant voltage source respectively thus getting electrically charged, said charged rotor pole members being displaced towards a respective adjacent of said stator pole members under said rotating electric field after said rotor member has been given same rotating speed as of said rotating electric field, thereby said electric motor device being a synchronous type of motor.

16. A motor device as defined in claim 15, wherein said rotor member has only one corresponding pair of pole members for each said trio of stator pole members.

17. A motor device as defined in claim 15, wherein said outer cylinder includes three electrically conductive stator ring members each interconnecting one of said groups of said stator conductor members to a respective phase of said three-phase voltage source, said inner cylinder includes two electrically conductive rotor ring members each interconnecting one of said sets of said rotor conductor members to a respective polarity of said constant voltage source.

18. A motor device as defined in claim 17, wherein two of said stator ring members are each located at a respective axial extremity of said outer cylinder, the third stator ring member is equally spaced apart from and inbetween the other two stator ring members, said rotor ring members are each located at a respective axial extremity of said inner cylinder.

19. A motor device as defined in claim 16, wherein all teeth of said pole members of both said stator and rotor members being fully covered with an insulating coat material to ensure no electric spark occur between teeth of adjacent stator and rotor pole members.

20. A motor device as defined in claim 19, wherein each of said teeth of both said stator and rotor pole members are substantially cylindrical in shape.

\* \* \* \* \*